US012570474B2

(12) United States Patent
Yu et al.

(10) Patent No.: US 12,570,474 B2
(45) Date of Patent: Mar. 10, 2026

(54) BATTERY CONVEYOR BELT

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Kang Chen, Foshan (CN); Aixia Li, Foshan (CN); Yinghao Xie, Foshan (CN); Xuemei Zhang, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 177 days.

(21) Appl. No.: 18/681,877

(22) PCT Filed: Aug. 25, 2022

(86) PCT No.: PCT/CN2022/114923
§ 371 (c)(1),
(2) Date: Feb. 7, 2024

(87) PCT Pub. No.: WO2023/093160
PCT Pub. Date: Jun. 1, 2023

(65) Prior Publication Data
US 2024/0351793 A1 Oct. 24, 2024

(30) Foreign Application Priority Data

Nov. 24, 2021 (CN) .......................... 202111409624.5

(51) Int. Cl.
B65G 21/20 (2006.01)
B65G 13/04 (2006.01)
B65G 43/08 (2006.01)

(52) U.S. Cl.
CPC ......... B65G 21/2072 (2013.01); B65G 13/04 (2013.01); B65G 43/08 (2013.01)

(58) Field of Classification Search
None
See application file for complete search history.

(56) References Cited

U.S. PATENT DOCUMENTS 5,088,596 A * 2/1992 Agnoff ................. B65G 13/073
198/788

FOREIGN PATENT DOCUMENTS

CN 216736275 U 6/2022

OTHER PUBLICATIONS

International Search Report of PCT Patent Application No. PCT/CN2022/114923 issued on Nov. 1, 2022.

* cited by examiner

*Primary Examiner* — William R Harp
(74) *Attorney, Agent, or Firm* — Westbridge IP LLC

(57) ABSTRACT

A battery conveyor belt includes a base, a plurality of parallel connecting shafts arranged on the base at intervals, and a plurality of conveying wheels arranged on the connecting shafts and each include a stator sleeved on the connecting shaft and fixed thereto, a rotor, a coil sleeved outside the stator, a pusher, a receiver located on the rotor, a control circuit, and a hub; the rotor is sleeved outside the coil, and there is a gap between the rotor and the coil; the hub is sleeved outside the rotor, and a first bearing is connected between the hub and the rotor; the pusher is connected to the hub and the rotor; the rotor drives the hub to rotate through the pusher; the control circuit is electrically connected to the (Continued)

coil and the receiver; and when a battery is placed on the hub, the pusher is pressed against the receiver.

10 Claims, 6 Drawing Sheets

BATTERY CONVEYOR BELT

TECHNICAL FIELD

The present disclosure relates to the technical field of waste battery recycling, and in particular to a battery conveyor belt.

BACKGROUND

In a recycling process of waste batteries, the waste batteries need to be pretreated before subsequent operations. In the pretreatment, a battery pack is generally first dismantled and discharged, and then subjected to preliminary processes such as crushing, pyrolysis, and screening to obtain a black battery powder; and the black battery powder is crushed and then undergoes the subsequent operations. A slow pretreatment process will affect the subsequent work. Therefore, how to efficiently dismantle a battery pack is the key to improving the efficiency of battery dismantling.

In the current battery pack dismantling process, many procedures need to be performed manually, which will inevitably reduce the work efficiency of battery pack dismantling. A battery pack usually includes a plurality of single cells and thus has a relatively high weight, and loading of a battery pack on a production line also needs to be done manually. In order to achieve the automatic dismantling of battery packs through a production line, it is necessary to first realize the sorting of battery packs on the production line, and in the sorting, an appropriate interval should be first provided among battery packs on a conveyor belt. However, there is currently no suitable devices for battery packs to be sorted in an orderly manner on the production line.

SUMMARY

A technical problem to be solved by the present disclosure: How to make battery packs placed on a conveyor belt automatically sorted at a specified interval.

In order to solve the above technical problem, the present disclosure provides a battery conveyor belt, including a base, a plurality of parallel connecting shafts, and a plurality of conveying wheels, where the connecting shafts are arranged on the base at intervals; the conveying wheels are arranged on the connecting shafts and each comprises a stator, a rotor, a coil, a pusher, a receiver, a control circuit, and a hub; the stator is sleeved on the connecting shaft and fixed to the connecting shaft; the coil is sleeved outside the stator; the rotor is sleeved outside the coil, and there is a gap between the rotor and the coil; the hub is sleeved outside the rotor, and a first bearing is connected between the hub and the rotor; the pusher is connected to the hub and the rotor; the rotor drives the hub to rotate through the pusher; the receiver is located on the rotor; the control circuit is electrically connected to the coil and the receiver; and when a battery is placed on the hub, the pusher is pressed against the receiver.

Further, the battery conveyor belt may further include an elastic member; the elastic member and the receiver may be both located in a direction opposite to a rotation direction of the pusher; one end of the elastic member may be connected to the pusher, and the other end of the elastic member may be connected to the rotor; and the receiver may be an action switch, and the receiver may be located within a moving range of the pusher.

Further, a groove may be formed on the rotor, and the receiver and the elastic member may be located in the groove; and one end of the pusher may be fixed to the hub, and the other end of the pusher may extend into the groove.

Further, the coil may be provided with a sliding rail, and the sliding rail may form a circle peripherally around the coil in a rotation direction of the rotor; and the rotor may be fixedly provided with a slipping ring, and the slipping ring may slidably abut against the sliding rail; and the receiver may be electrically connected to the slipping ring, the slipping ring may be electrically connected to the sliding rail, and the control circuit may be electrically connected to the sliding rail.

Further, a cavity may be formed inside the connecting shaft, and a power supply line may be provided in the cavity; a plurality of through-holes may be formed on the connecting shaft, and the through-holes may correspond to the conveying wheels one to one; and the through-holes may communicate with the cavity, and the power supply line may pass through the through-holes to be electrically connected to the control circuit.

Further, an annular mounting slot may be formed on the stator, the coil may be located in the mounting slot, a first bearing may be connected between the stator and the rotor, and a second bearing may be connected between the hub and the rotor.

Further, a rubber sleeve may be provided on the hub, and the rubber sleeve may be sleeved outside the hub.

Further, a pair of side baffles may be provided on the base, the side baffles may be located above the conveying wheels, and there may be a conveying space between the two side baffles.

Further, surfaces of the two side baffles may be inclined to each other, and the conveying space may be trapezoidal.

Further, a plurality of side rollers may be provided on the side baffle, and surfaces of the side rollers may be exposed to the conveying space.

Compared with the prior art, the battery conveyor belt of the embodiment examples of the present disclosure has the following beneficial effects: By arranging the receiver on the rotor, when the conveying wheel is under a pressure of a battery, the rotor can accelerate the rotation of the hub, and thus batteries on the conveying wheel are accelerated to be distanced from rear batteries thereof, such that there is an interval between two rows of batteries on the battery conveyor belt, and the plurality of batteries are successfully sorted at a specified interval.

Figure 1:
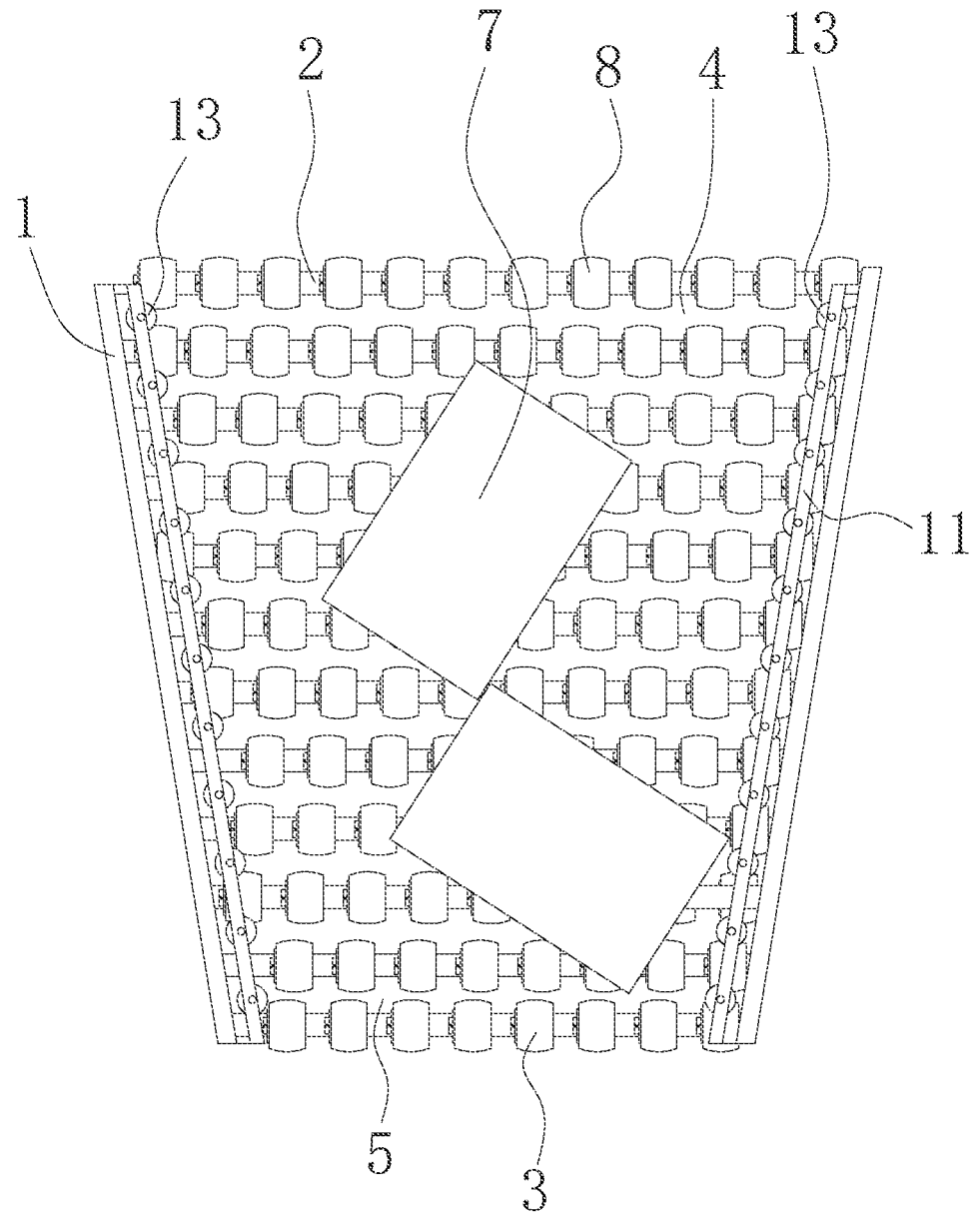
FIG. 1 is a schematic structural diagram of a section of the battery conveyor belt.

In the figures, 1 represents a base; 11 represents a side baffle; 12 represents a conveying space; 13 represents a side roller; 2 represents a connecting shaft; 21 represents a cavity; 22 represents a through-hole; 3 represents a conveying wheel; 31 represents a stator; 311 represents a second bearing; 32 represents a rotor; 321 represents a groove; 322 represents a slipping ring; 323 represents a first bearing; 33 represents a coil; 331 represents a sliding rail; 34 represents a pusher; 35 represents a receiver; 36 represents a control circuit; 37 represents a hub; 371 represents a rubber sleeve; 38 represents a fixed ring; 39 represents a blocking plate; 4 represents an initial end; 5 represents a tail end; 6 represents an elastic member; 7 represents a battery; and 8 represents a constant-velocity wheel.

DETAILED DESCRIPTION

The specific implementations of the present disclosure are described in more detail below with reference to the accompanying drawings and embodiment examples. The following embodiment examples are intended to illustrate the present disclosure, rather than to limit the scope of the present disclosure.

In the description of the present disclosure, it should be understood that orientation or position relationships indicated by terms such as "upper", "lower", "left", "right", "front", "rear", "top", and "bottom" are orientation or position relationships as shown in the drawings. These terms are merely intended to facilitate and simplify the description of the present disclosure, rather than to indicate or imply that the mentioned device or components must have a specific orientation or must be constructed and operated in a specific orientation. Therefore, these terms should not be understood as a limitation to the present disclosure.

Figure 2:
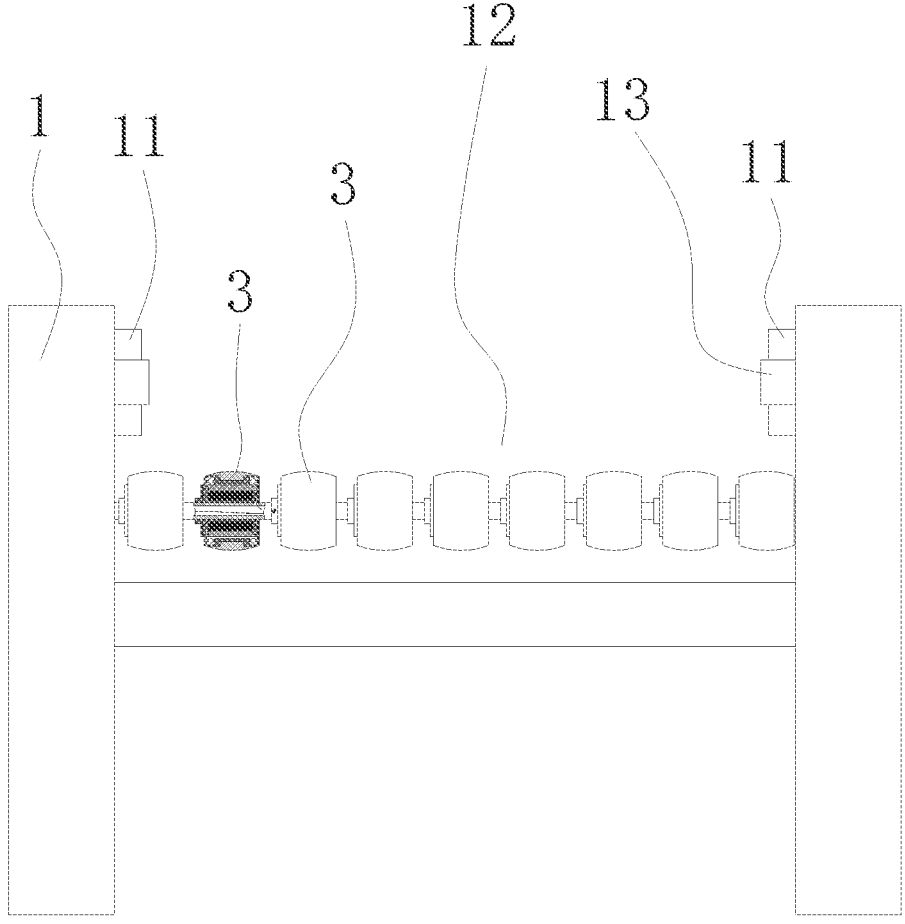
FIG. 2 is a schematic structural diagram of the base.

As shown in FIG. 1 and FIG. 2, a battery conveyor belt according to a preferred embodiment example of the embodiment examples of the present disclosure includes a base 1, a plurality of parallel connecting shafts 2, and a plurality of conveying wheels 3, where the connecting shafts 2 are arranged on the base 1, and the conveying wheels 3 are arranged on the connecting shafts 2; and when a battery 7 is placed on the conveying wheel 3, the conveying wheel 3 will rotate at an accelerated speed to pass the battery 7 away.

In order to facilitate the understanding of the inventive concept of the present disclosure, a section of the entire battery conveyor belt is selected and shown in FIG. 1, where the battery conveyor belt is provided with an initial end 4 and a tail end 5, with the tail end 5 in the front and the initial end 4 in the back. The battery 7 is placed on the initial end 4 and outputted from the tail end 5. The connecting shafts 2 extend in a horizontal direction, and the connecting shafts 2 are arranged at intervals from the initial end 4 to the tail end 5. The base 1 includes a pair of brackets, one end of the connecting shaft 2 is fixed to one of the brackets, and the other end of the connecting shaft 2 is fixed to the other bracket. The connecting shafts 2 cannot rotate relative to the bracket. As shown in FIG. 1 to FIG. 4, the conveying wheel 3 includes a stator 31, a rotor 32, a coil 33, a pusher 34, a receiver 35, a control circuit 36, and a hub 37. The connecting shaft 2 is provided with an annular fixed ring 38, and the fixed ring 38 is sleeved outside the connecting shaft 2 and is fixed to the connecting shaft 2 through screws. The stator 31 is annular and sleeved outside the connecting shaft 2, the stator 31 is located at one side of the fixed ring 38, and fixed to the fixed ring 38 through screws.

As shown in FIG. 1 to FIG. 4, the coil 33 is sleeved outside the stator 31, and the coil 33 is fixed to the stator 31. The rotor 32 is sleeved outside the coil 33, and there is a gap between the rotor 32 and the coil 33. When the coil 33 is electrified, the rotor 32 can rotate around the stator 31 under the action of the coil 33. The hub 37 is sleeved outside the rotor 32, a first bearing 323 is connected between the hub 37 and the rotor 32, and the pusher 34 is connected to the hub 37 and the rotor 32. When the rotor 32 rotates, the rotor 32 drives the hub 37 to rotate through the pusher 34. The receiver 35 is located on the rotor 32, and the control circuit 36 is electrically connected to the coil 33 and the receiver 35. When a battery 7 is placed on the hub 37, the pusher 34 applies a pressure to the receiver 35. The battery conveyor belt may further include a constant-velocity wheel 8. The battery conveyor belt may be divided into at least two acceleration zones and at least two constant-velocity zones. The acceleration zones and the constant-velocity zones are arranged alternately along a conveying direction of the battery conveyor belt, all rotating shafts in the acceleration zones are provided with a conveying wheel 3, and all rotating shafts in the constant-velocity zones are provided with a constant-velocity wheel 8. During a normal operation, a rotation speed of a wheel face of the constant-velocity wheel 8 remains unchanged. A length of the acceleration zones in the conveying direction of the battery conveyor belt is greater than a maximum length of the battery 7, and a length of the constant-velocity zones in the conveying direction of the battery conveyor belt is greater than a maximum length of the battery 7. Through this design, when a plurality of batteries 7 are placed in sequence on the battery conveyor belt, a battery 7 will be distanced from a following battery 7 thereof after passing through the acceleration zones, and as the batteries 7 alternately pass through the acceleration zones and the constant-velocity zones, a distance between each battery 7 and a following battery 7 thereof will be larger and larger, such that the plurality of batteries 7 are successfully sorted at a specified interval.

A working process of the present disclosure: When a battery 7 passes through the initial end 4, the battery 7 is conveyed towards the tail end 5 at a constant velocity under the action of the constant-velocity wheel 8; when the battery 7 abuts against an upper surface of the conveying wheel 3, the battery 7 applies a pressure to the hub 37, the pusher 34 is affected and comes into contact with the receiver 35, the receiver 35 sends an electrical signal to the control circuit 36, and the control circuit 36 changes a current passing through the coil 33; and then the rotor 32 rotates at an accelerated speed, the rotor 32 pushes the hub 37 through the pusher 34, and a rotation speed of the hub 37 is also increased, such that the conveying wheel 3 conveys the battery 7 away at an accelerated speed, at which point a following battery 7 thereof is still conveyed on the constant-velocity wheel 8 and thus is gradually distanced from the battery 7 on the conveying wheel 3. A speed of each conveying wheel 3 has an upper limit, and thus the conveying wheel will not be accelerated continuously under the pressure of the battery 7. In this embodiment example, the closer the conveying wheel 3 is to the tail end 5, the greater the acceleration of the conveying wheel. Even if a plurality of batteries 7 are accelerated by the conveying wheel 3, the battery 7 in the front can be distanced from the battery 7 in the back. In this embodiment example, the receiver 35 may be a sensor or an action switch, and the sensor or action switch is provided to receive an external pressure, such that the receiver 35 transmits an electrical signal to the control circuit 36. It belongs to the prior arts that the control circuit 36 receives the electrical signal transmitted by the sensor and then changes a current of the coil 33, and the present disclosure does not improve the circuit structure.

In summary, a battery conveyor belt is provided in the embodiment examples of the present disclosure, where by arranging the receiver 35 on the rotor 32, when the conveying wheel 3 is under a pressure of a battery 7, the rotor 32 can accelerate the rotation of the hub 37, and thus batteries 7 on the conveying wheel 3 are accelerated to be distanced from following batteries 7 thereof, such that there is an interval between two rows of batteries 7 on the battery conveyor belt, and the plurality of batteries 7 are successfully sorted at a specified interval.

As shown in FIG. 1 to FIG. 6, in this embodiment example, the battery conveyor belt may further include an elastic member 6. The elastic member 6 and the receiver 35 are both located in a direction opposite to a rotation direction of the pusher 34. The elastic member 6 is composed of two springs. One end of the elastic member 6 is connected to the pusher 34, and the other end of the elastic member 6 is connected to the rotor 32. The receiver 35 is located between the two springs. The receiver 35 is an action switch, and the receiver 35 is located within a moving range of the pusher 34. When there is no battery 7 on the conveying wheel 3 and the rotor 32 rotates at a constant velocity, the rotor 32 pushes the pusher 34 through the two springs, and the pusher 34 drives the hub 37 to rotate, at which point the action switch is not in contact with the pusher 34. When a battery 7 is placed on the conveying wheel 3, the battery 7 applies a pressure to the hub 37, the hub 37 applies a pressure to the first bearing 323, and an internal friction of the first bearing 323 increases, at which point the rotor 32 still keeps rotating forwards, a rotation speed of the hub 37 cannot keep up with that of the rotor 32 under the action of friction, and thus the rotor 32 rotates relative to the hub until the pusher 34 abuts against the receiver 35; the receiver 35 fixed on the rotor 32 pushes the hub 37 to rotate, and the receiver 35 is closed to send an electrical signal, the control circuit 36 receives the electrical signal and changes a current of the coil 33, such that the rotor 32 rotates at an accelerated speed, the rotor 32 pushes the pusher 34 through the receiver 35, and the pusher 34 pushes the hub 37 to rotate at an accelerated speed.

In other embodiment examples, the receiver 35 may be a pressure sensor located below the pusher 34. When a battery 7 is placed on the conveying wheel 3, the hub 37 applies a pressure to the pusher 34, then the pusher applies a pressure to the pressure sensor, the pressure sensor sends an electrical signal to the control circuit 36, and the control circuit 36 changes a current of the coil 33, such that the rotor 32 rotates at an accelerated speed, the rotor 32 pushes the pusher 34 through the receiver 35, and the pusher 34 pushes the hub 37 to rotate at an accelerated speed.

As shown in FIG. 3 to FIG. 6, a groove 321 may be formed on the rotor 32, and the receiver 35 and the elastic member 6 may be located in the groove 321; one end of the pusher 34 may be fixed to the hub 37, and the other end of the pusher 34 may extend into the groove 321; the groove 321 can accommodate and protect the receiver 35 and the elastic member 6. In other embodiment examples, the receiver 35 and the elastic member 6 may be directly arranged on an outer surface of the rotor 32, while the pusher 34 may be still fixed on the hub 37. The coil 33 may be provided with a sliding rail 331, the sliding rail 331 may form a circle peripherally around the coil 33 in a rotation direction of the rotor 32; a slipping ring 322 may be fixed on the rotor 32, and the slipping ring 322 may slidably abut against the sliding rail 331; and the receiver 35 may be electrically connected to the slipping ring 322, the slipping ring 322 may be electrically connected to the sliding rail 331, and the control circuit 36 may be electrically connected to the sliding rail 331. The control circuit 36 may include an annular circuit board, where the circuit board is fixed on one side of the stator 31, the circuit board has been electrically connected to the sliding rail 331 through a wire, and the slipping ring 322 is electrically connected to the receiver 35 through a wire of the receiver 35, such that when the rotor

32 rotates, the circuit board can remain electrically connected to the receiver 35 and can transmit an electrical signal.

Figure 3:
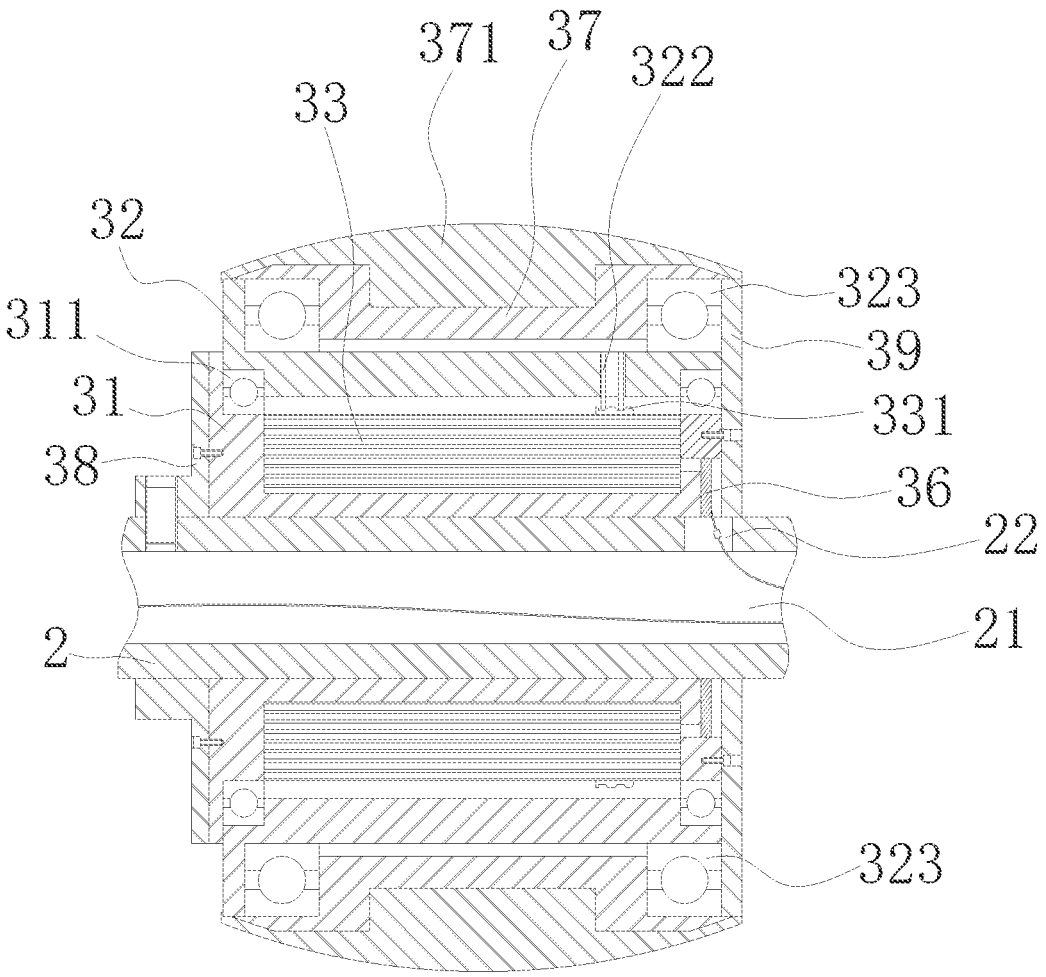
FIG. 3 is a schematic diagram of an internal structure of the conveying wheel.
Figure 4:
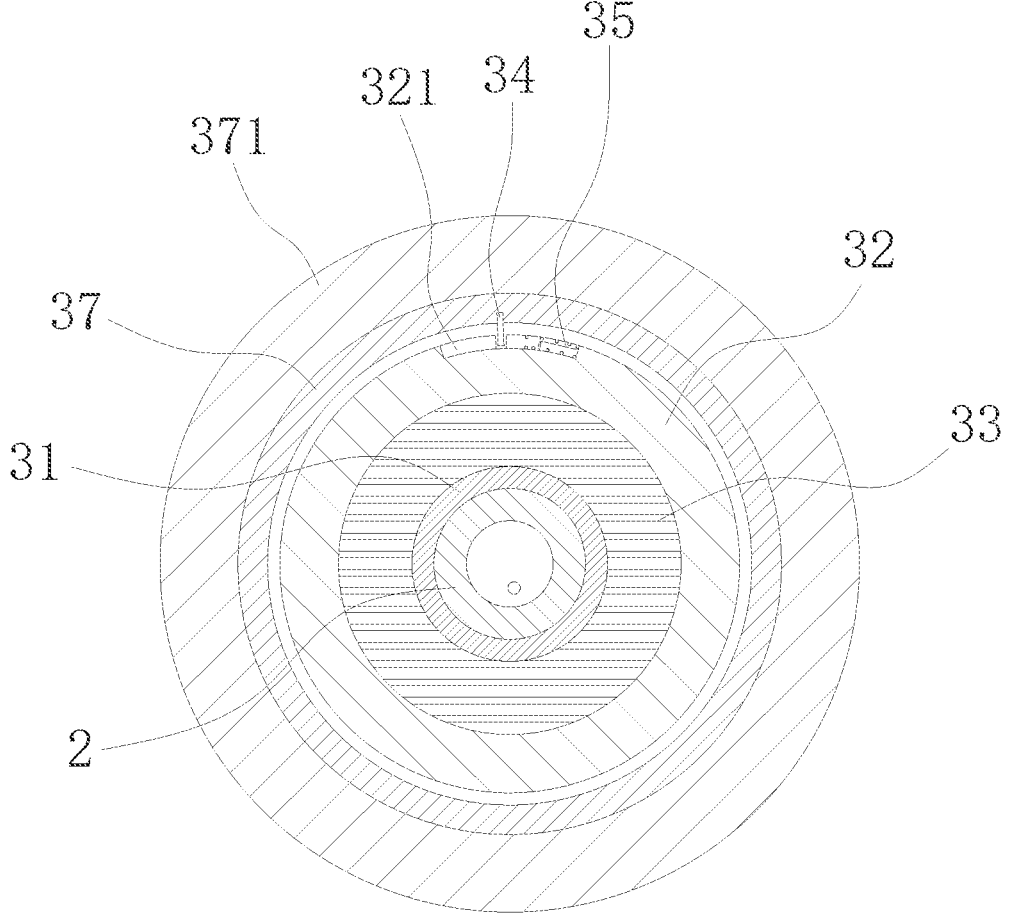
FIG. 4 is a cross-sectional view of the conveying wheel.
Figure 5:
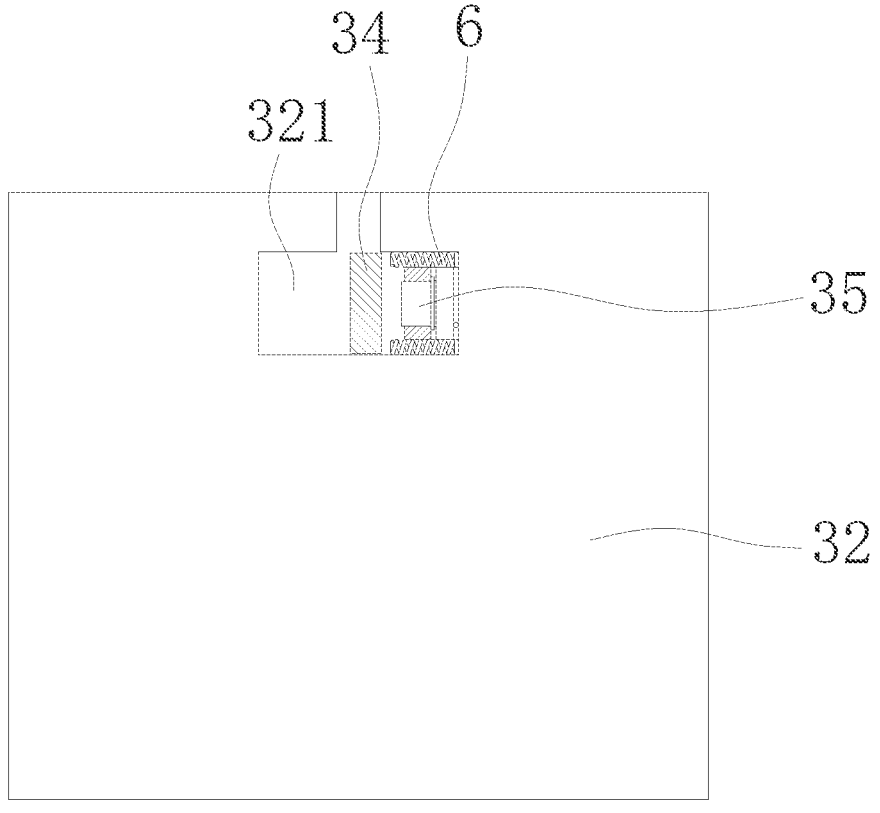
FIG. 5 is a schematic diagram of an internal structure of the groove.
Figure 6:
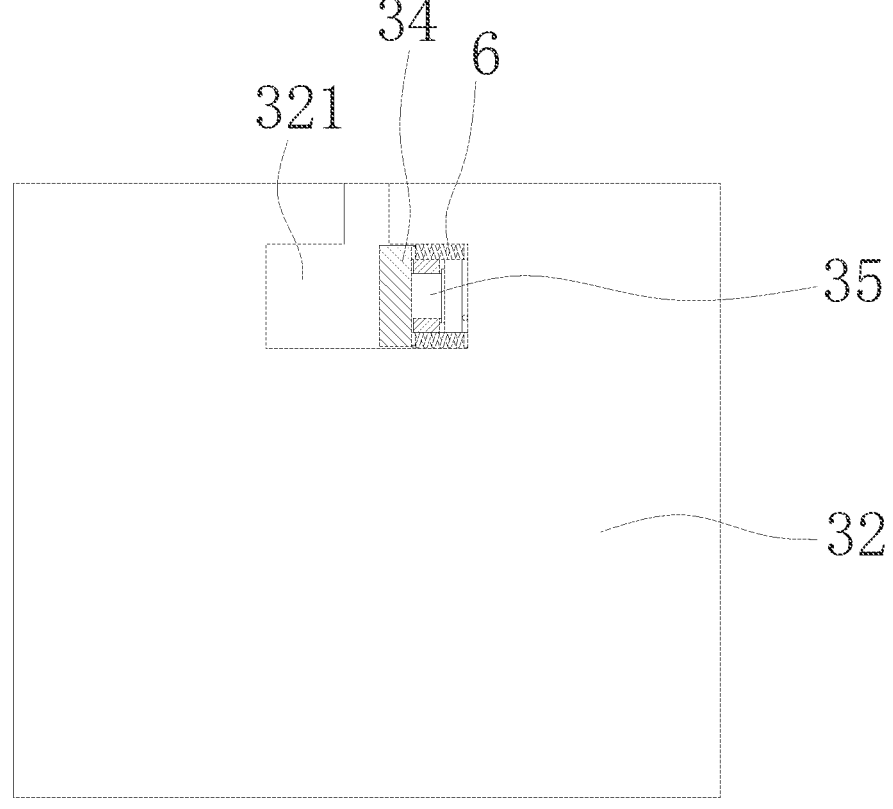
FIG. 6 is a schematic diagram illustrating the contact between the pusher and the receiver.

As shown in FIG. 3 and FIG. 4, a cavity 21 may be formed inside the connecting shaft 2, a power supply line may be provided in the cavity 21, and a plurality of through-holes 22 may be formed on the connecting shaft 2; the through-holes 22 may correspond to the conveying wheels 3 one to one, the through-holes 22 may communicate with the cavity 21, and the through-holes 22 may be located directly below the conveying wheels 3; and the power supply line passes through the through-holes 22 to be electrically connected to the control circuit 36. The arrangement of the power supply line in the cavity 21 can reduce a space occupied by the power supply line, and arrangement positions of the through-holes 22 can prevent the power supply line from being exposed from the conveying wheel 3, thereby ensuring the safety of the power supply line.

As shown in FIG. 1 to FIG. 5, an annular mounting slot may be formed on the stator 31, and the coil 33 may be located in the mounting slot; and a first bearing 323 may be connected between the stator 31 and the rotor 32, and a second bearing 311 may be connected between the hub 37 and the rotor 32. The coil 33 is arranged in the mounting slot, such that the coil 33 can be protected by the mounting slot. An annular blocking plate 39 may be provided at a side of the circuit board facing away from the stator 31, the blocking plate 39 may be fixed on the stator 31 through screws, and the blocking plate 39 can protect the circuit board and prevent the circuit board from detaching. The hub 37 may be provided with a rubber sleeve 371, and the rubber sleeve 371 may be sleeved outside the hub 37. When a battery 7 is placed on the conveying wheel 3, the rubber sleeve 371 can increase a friction between the conveying wheel 3 and the battery 7 to prevent the battery 7 from slipping off due to the too-fast rotation of the hub 37.

As shown in FIG. 1 to FIG. 2, the base 1 may be provided with a pair of side baffles 11, the side baffles 11 may be located above the conveying wheel 3, and there may be a conveying space 12 between the two side baffles 11. When the side baffles 11 are provided to block the conveying wheel 3 from conveying the battery 7, the battery 7 falls from a side of the battery conveyor belt to ensure that the battery 7 can only be conveyed in the conveying space 12. Surfaces of the two side baffles 11 may be inclined to each other, the conveying space 12 may be trapezoidal, and a narrowest position of the conveying space 12 allows only one battery 7 to pass through, which ensures that the batteries 7 do not come out side by side from the tail end 5 of the battery conveyor belt. The side baffle 11 may be provided with a plurality of side rollers 13, and surfaces of the side rollers 13 are exposed in the conveying space 12. The side rollers 13 can not only prevent a battery 7 from falling from a side of the battery conveyor belt, but also protect the battery 7 to prevent the battery 7 from being scratched.

The above are only preferred implementations of the present disclosure. It should be noted that several improvements and replacements may further be made by a person of ordinary skill in the art without departing from the principle of the present disclosure, and such improvements and replacements should also be deemed as falling within the protection scope of the present disclosure.

The invention claimed is:

1. A battery conveyor device, comprising a base, a plurality of parallel connecting shafts, and a plurality of conveying wheels, wherein the connecting shafts are arranged on the base at intervals; the conveying wheels are arranged on the connecting shafts and each comprises a stator, a rotor, a coil, a pusher, a receiver, a control circuit, and a hub; the stator is sleeved on the connecting shaft and fixed to the connecting shaft; the coil is sleeved outside the stator; the rotor is sleeved outside the coil, and there is a gap between the rotor and the coil; the hub is sleeved outside the rotor, and a first bearing is connected between the hub and the rotor; the pusher is connected to the hub and the rotor; the rotor drives the hub to rotate through the pusher; the receiver is located on the rotor; the control circuit is electrically connected to the coil and the receiver; and when a battery is placed on the hub, the pusher is pressed against the receiver.

2. The battery conveyor device according to claim 1, wherein the battery conveyor device further comprises an elastic member; the elastic member and the receiver are both located in a direction opposite to a rotation direction of the pusher; one end of the elastic member is connected to the pusher, and the other end of the elastic member is connected to the rotor; and the receiver is an action switch, and the receiver is located within a moving range of the pusher.

3. The battery conveyor device according to claim 2, wherein a groove is formed on the rotor, and the receiver and the elastic member are located in the groove; and one end of the pusher is fixed to the hub, and the other end of the pusher extends into the groove.

4. The battery conveyor device according to claim 1, wherein the coil is provided with a sliding rail, and the sliding rail forms a circle peripherally around the coil in a rotation direction of the rotor; and the rotor is fixedly provided with a slipping ring, and the slipping ring slidably abuts against the sliding rail; and the receiver is electrically connected to the slipping ring, the slipping ring is electrically connected to the sliding rail, and the control circuit is electrically connected to the sliding rail.

5. The battery conveyor device according to claim 1, wherein a cavity is formed inside the connecting shaft, and a power supply line is provided in the cavity; a plurality of through-holes are formed on the connecting shaft, and the through-holes correspond to the conveying wheels one to one; and the through-holes communicate with the cavity, and the power supply line passes through the through-holes to be electrically connected to the control circuit.

6. The battery conveyor device according to claim 1, wherein an annular mounting slot is formed on the stator, the coil is located in the mounting slot, and a second bearing is connected between the stator and the rotor.

7. The battery conveyor device according to claim 1, wherein a rubber sleeve is provided on the hub, and the rubber sleeve is sleeved outside the hub.

8. The battery conveyor device according to claim 1, wherein a pair of side baffles are provided on the base, the side baffles are located above the conveying wheels, and there is a conveying space between the two side baffles.

9. The battery conveyor device according to claim 8, wherein surfaces of the two side baffles are inclined to each other, and the conveying space is trapezoidal.

10. The battery conveyor device according to claim 8, wherein a plurality of side rollers are provided on the side baffle, and surfaces of the side rollers are exposed to the conveying space.

* * * * *